July 29, 1941.  G. ALGARSSON  2,250,694
MECHANISM FOR CONTROLLING THE PITCH OF AIRSCREW BLADES
Filed Nov. 15, 1937  4 Sheets-Sheet 1
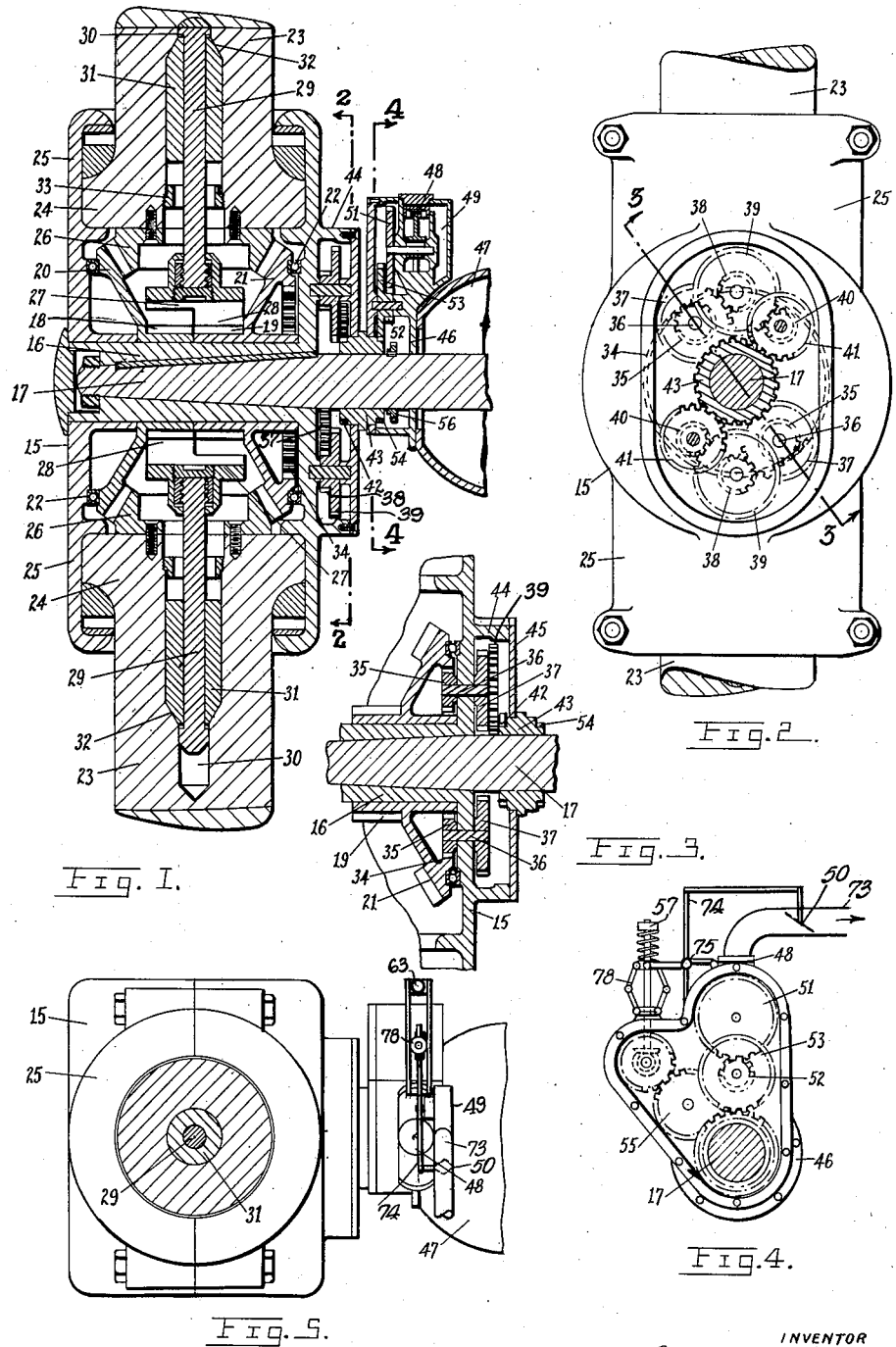

July 29, 1941. G. ALGARSSON 2,250,694
MECHANISM FOR CONTROLLING THE PITCH OF AIRSCREW BLADES
Filed Nov. 15, 1937 4 Sheets-Sheet 2
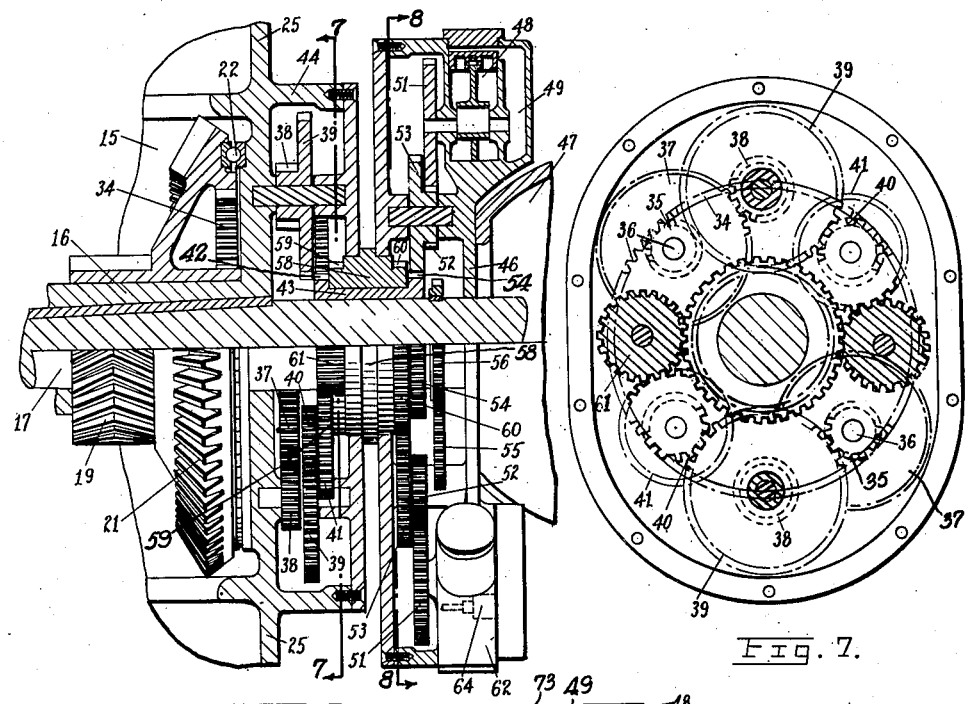

July 29, 1941.  G. ALGARSSON  2,250,694
MECHANISM FOR CONTROLLING THE PITCH OF AIRSCREW BLADES
Filed Nov. 15, 1937  4 Sheets-Sheet 3

INVENTOR
GRETTIR ALGARSSON
BY
ATTORNEY

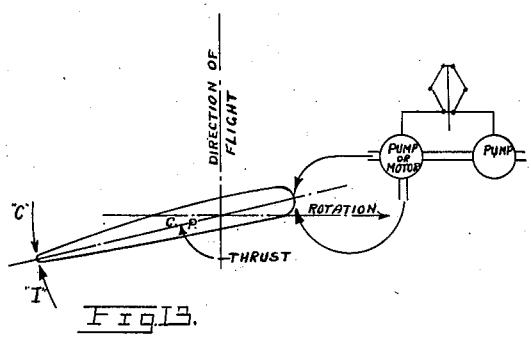
Fig.13.
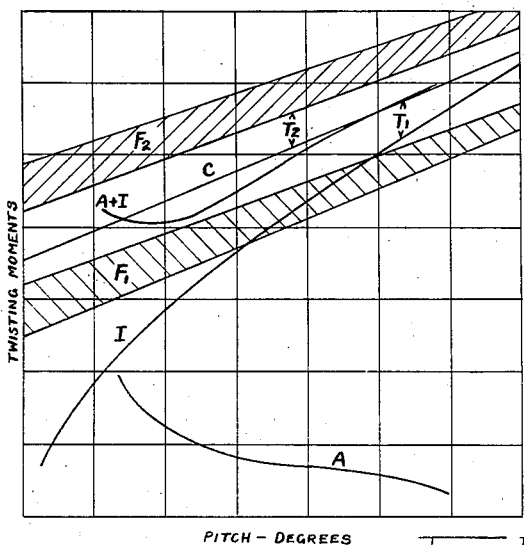
PITCH — DEGREES  Fig.15.
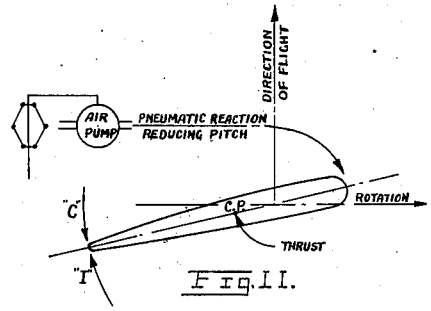
Fig.11.
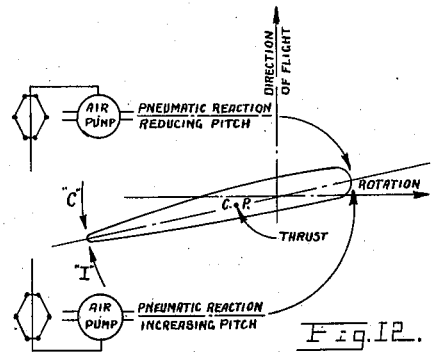
Fig.12.
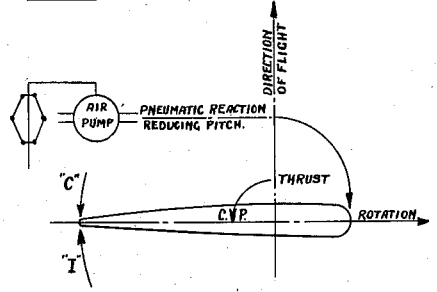
Fig.14.

Patented July 29, 1941

2,250,694

UNITED STATES PATENT OFFICE 2,250,694

MECHANISM FOR CONTROLLING THE PITCH OF AIRSCREW BLADES

Grettir Algarsson, Montreal, Quebec, Canada, assignor to Algarsson Engineering Company Limited, Montreal, Quebec, Canada Application November 15, 1937, Serial No. 174,514

8 Claims. (Cl. 170—163)

This invention relates to mechanism for controlling the pitch of airscrew blades, particularly as applied to constant speed airscrews, as described in the present specification and illustrated in the accompanying drawings that form part of the same.

The invention consists essentially in opposing the resultant of the twisting moments, aerodynamic and centrifugal, inherent in the functioning of the blades of an airscrew, which resultant tends to reduce the pitch of the blades, by another moment tending to increase the pitch of the blades to effect an approximate balance of the moments, and through mechanical means creating a torque reaction directly effective on the airscrew blades to achieve a precise pitch setting.

One of the objects of the invention is to provide means whereby the engine and airscrew of aircraft will maintain a selected R. P. M. under all operating conditions thereby facilitating the synchronizing of the engines of multi-engined aircraft and reducing vibration to a minimum.

A further object of the invention is to provide an airscrew capable in itself of automatically accomplishing an approximate adjustment of pitch setting, thereby reducing to a minimum the force necessary to achieve the precise pitch setting required.

A further object is to provide a constant speed mechanism through which the pitch of the airscrew blades is adjusted to absorb the load required to maintain constant R. P. M. of both airscrew and engine.

A further object is to provide an effective air brake whereby the airspeed of aircraft can be reduced more rapidly and landing in restricted areas and under adverse conditions is facilitated.

A further object is to provide means of reversing the thrust in single or multi-engined aircraft at the will of the pilot, thus facilitating handling of the aircraft on the ground or on water, before take-off and after landing.

Further objects are to provide a constant speed airscrew which requires no hydraulic, pneumatic or electrical connections from the body of the aircraft to the airscrew hub; whose mechanism is compact and which requires only a simple mechanical connection whereby the control of the airscrew is within the control of the pilot.

In order to more clearly point out the novel features of the invention, reference is made to the accompanying drawings in which, Figure 1 is a vertical fore and aft section of the hub and roots of an airscrew mounted on the engine drive shaft and showing the control and constant speed mechanism.

Figure 2 is a vertical section on the line 2—2 of Figure 1, looking forward on the airscrew hub and showing the gear trains on the rear of the hub.

Figure 3 is a partial fore and aft section on the line 3—3 of Figure 2, showing more clearly the integral spur and bevel gear and its connection with the gear train.

Figure 4 is a vertical cross section on the line 4—4 of Figure 1 looking aft on the engine casing and showing the air pump with its governor and driving gears.

Figure 5 is a plan view of the airscrew hub and constant speed mechanism, with the blade root in section above the hub.

Figure 6 illustrates an arrangement in which two air pumps are shown, their torque reactions operating in opposite directions upon the airscrew blades. The view being a partial fore and aft section of the airscrew hub and gear train casings, showing the gears and shafts in full below the horizontal centre line.

Figure 7 is a vertical section on the line 7—7 of Figure 6 looking forward on the airscrew. In this view the whole of the gear trains are shown, the hidden gears being shown dotted.

Figure 8 is a vertical section on the line 8—8 of Figure 6 looking aft on the engine casing.

Figure 9 is a diagrammatic showing of an arrangement employing an air pump directly driven by the engine for applying reverse torque through the air pump driven by the airscrew.

Figure 11 is a diagram showing a typical blade section and the direction of the various forces acting upon it, including the reactive force of one air pump.

Figure 12 is a diagram similar to that illustrated in Figure 11 but showing an additional air pump whose action tends to increase the pitch setting of the blades.

Figure 13 is a diagram similar to Figure 11 but illustrating the arrangement shown in Figure 9.

Figure 14 is a diagram similar to Figure 11 showing the operating of one air pump reducing the pitch to the point where thrust is reversed.

Figure 15 is a graph illustrating generally the aerodynamic moments, the centrifugal moments inherent in the blades, and the control moments; the shaded areas indicate the friction moments which the constant speed mechanism will have to overcome in addition to correcting the balance between the other three moments.

Figure 10:
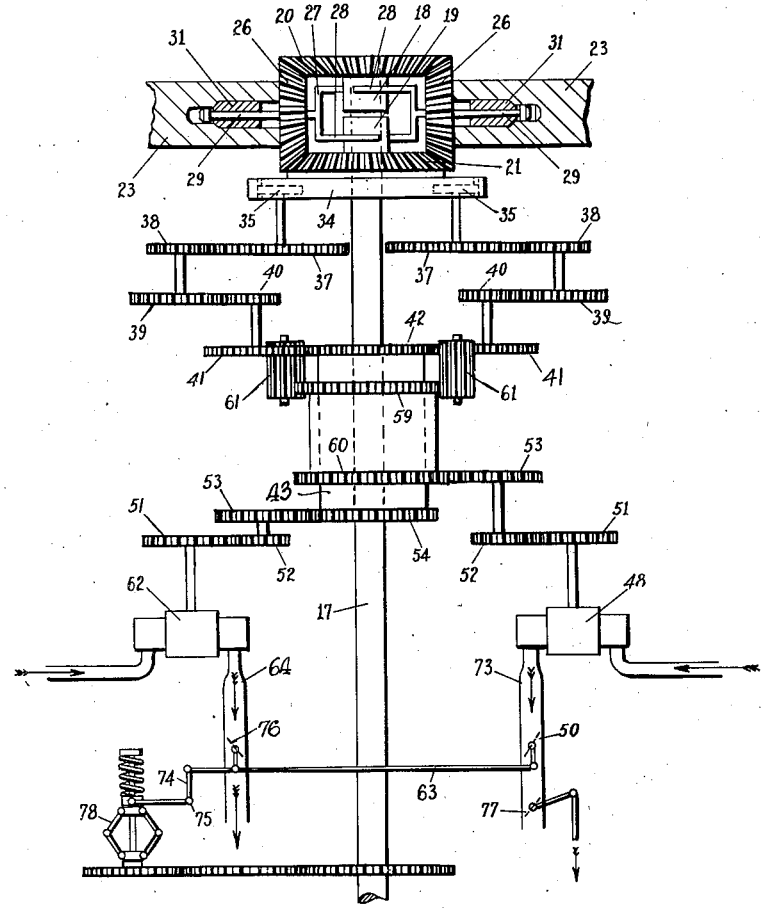
Figure 10 is an extended diagram showing the blade roots with the interconnection of the centrifugal control mechanism and the constant speed mechanism, which is here shown with two air pumps, one for increasing pitch and the other for reducing pitch.

Referring to the drawings, the airscrew hub casing 15 is made in two halves which are bolted together, the rear half of which is provided with a central sleeve 16 projecting forwardly to the wall of the front half of the hub casing. This sleeve 16 has a tapered bore to receive the tapered end of the engine shaft 17. The periphery of the sleeve 16 provides a journal bearing for the spur gears 18 and 19. These spur gears 18 and 19 are set one fore and one aft of the airscrew axis and are integral with the bevel gears 20 and 21.

The blades 23 have their roots 24 mounted in extensions 25 of the hub casing 15 and are rotatable therein. Fixedly mounted on the inner face of each blade root 24 are the bevel gears 26, each of which meshes with the bevel gears 20 and 21 in such manner that any movement of the gears will rotate the blades about their axis in opposite directions to each other.

Yokes 27 carry a pair of rack arms 28, each of which is offset from the vertical axis to engage, one on each side, with one of the spur gears 18 and 19. Each yoke 27 is mounted on the end of a rod 29. These rods 29 extend into the bores 30 of the blade roots 24 each of which bores has two diameters, the small outer diameter forming a guide for the rod 29 and the larger inner diameter forming a guide for the single sliding weight 31. The junction of the two sections forms a shoulder 32 and a stop for the weight 31.

A plug 33 in the bore 30 of the blade roots 24 forms a stop for the weights 31 when the airscrew is at rest.

The foregoing mechanism is hereinafter described as the control mechanism and directly produces the control moments later described in setting forth the operation of the invention.

In the back of the bevel gear 21 there is formed an annular ring gear 34. A spur gear 35 (see Figure 3) is mounted on one end of the shaft 36 and meshes with the annular ring gear 34, while the gear 37 is mounted on the other end of the shaft 36. The train of gears is continued with the members 38, 39, 40 and 41 (see Figure 2) to give the desired mechanical advantage and is balanced on the opposite side of the engine shaft by a similar train of gears. The final member 41 of the gear trains meshes with the gear 42 on the forward end of the sleeve 43 which is journalled on the engine shaft 17. These trains of gears are shown housed outside the hub casing and enclosed by a cover plate 54, but may be equally well housed within the hub casing.

Mounted on the front cover plate 46 of the engine crank case 47 is an air pump 48, preferably of the multi-cylinder type and provided with a common air chamber 49, the outlet 73 from which is controlled by a valve 50. The air pump 48 is driven by the train of gears 51, 52 and 53, the member 53 meshing with the gear 54 on the rear end of the sleeve 43.

It will therefore be seen that with the air pump 48 stationary and the airscrew rotating, the gear trains engaging with the forward gear 42 of the sleeve 43 rotate with the airscrew about the shaft axis and carry with them the sleeve at the same R. P. M. as the airscrew. The sleeve therefore becomes the driving member of the air pump.

The air pump valve 50 is controlled by a governor 78 driven by a train of gears 55 from the gear 56 fixed on the engine shaft 17. The levers 74 pivoted at 75 are the operating connections between the governor 78 and the valve 50. This governor 78 is provided with a control 57 whose setting can be altered by the pilot, through any suitable connection passing through to the cockpit of the aircraft.

When the valve 50 is in the closed position, the load built up in the air pump will cause a reaction torque on the trains of gears back to the bevel gears within the airscrew hub, tending to rotate them and incidentally rotate the airscrew blades about their axes. As the airscrew always rotates in one direction, it will be seen that this torque reaction will only rotate the blades in one direction, in this case to reduce their pitch setting.

The above mechanism consisting of gear trains, sleeve, air pump and governor is hereinafter referred to as the constant speed mechanism.

Where it is desirable that the reaction torque should be available to cause a rotation of the blades in either direction, an air pump is provided for each direction, as illustrated in Figures 6, 7 and 8 and diagrammatically in Figure 10. In this arrangement an additional sleeve 58 having fore and aft gears 59 and 60 (see Figure 10) is provided, and is shown as independently journalled on the sleeve 43. The gear wheels 61 engage with the last members 41 of the trains of gears between the bevel gears and the sleeve 43. These gears have extended width in order to engage with the gear 59 on the sleeve 58, thus causing the bevel gears to rotate, on application of reactive torque from the pump 62, in the reverse sense from that caused by the application of reactive torque from the pump 48.

The drives for the air pumps 48 and 62 are similar to each other, but are taken off, one from each of the sleeves 43 and 58.

It will be understood that the gear trains illustrated and described may be modified to give any combination of ratios between the bevel gears and the air pump drives.

On account of the limited space between the crank case face plate and the airscrew hub, other forms of drive may be used, such as a system of planetary gears housed completely in the annular space within the bevel gear 21. Such modifications all being within the scope of this invention.

Where two pumps are employed, an additional connection 63 from the governor operates the control valve 64 in the discharge line 76 of the pump 62 in such a manner that when the engine is running at the desired R. P. M., both valves are open and no load is on either pump, therefore there is no reactive torque effective on the blades in either direction.

In all cases, the air pumps are protected against overload by relief valves which can be set to any desired pressure.

In order to reduce the number of parts and the weight of mechanism, particularly those that rotate with the airscrew, one of the pumps employed may be driven directly from the engine in any suitable manner. In such an instance, the operation is illustrated diagrammatically in Figures 9 and 13. The pump 65 is shown as being driven from the sleeve 43, while the pump 66 is driven from the gear 67 fixed on the engine shaft 17. The pump 66 is of greater capacity than the pump 65, in order that its discharge may act on the pump 65 to convert it into a motor to give a reverse drive to the sleeve 43 and therethrough to the bevel gears and blades.

On the discharge side of the pump 66 a pipe connection 67 leads to the inlet side of the pump 65, while an intermediate connection 68 leads to the atmosphere. The discharge 69 of the pump 65 is led directly to the atmosphere and is provided with a valve 70. A similar valve 71 is provided in the discharge 68. Both valves 70 and 71 being controlled by the governor 72 in the same manner as illustrated in Figure 8.

In the operation of this invention, the application of the control mechanism in conjunction with one air pump, to obtain a precise pitch setting of the airscrew blades, will be set forth.

During flight, the blades are subjected to inherent centrifugal forces and aerodynamic forces, the resultant of which tends to reduce the pitch setting of the blades. The moments produced by these two forces are more than overbalanced by what are hereinafter called the control moments, which moments are produced by the action of centrifugal force upon the control mechanism. These control moments tend to increase the pitch setting of the blades.

In Figure 1 the rods 29 are shown in a position from which they can travel either outwards or inwards from the airscrew axis. If they travel outwards they slide in the bores of the weights 31, but if they travel inwards the enlarged heads of the rods 29 engage with the outer ends of the weights 31 and draw them inwards away from the shoulders 32.

While the sliding weight 31 is in any intermediate position between the plug 33 and the shoulder 32, it is restrained from outward movement by the enlarged head of the rod 29. Under this condition the mass of the weight 31 is added to that of the rod 29, their combined centrifugal mass then being effective to produce the control moments over-balancing the inherent centrifugal and aerodynamic moments.

When the weight 31 has moved outwards against the shoulder 32 as shown in Figures 1 and 10, and the rod 29, with its enlarged head, has moved sufficiently to leave the weight behind, the effective centrifugal mass producing the control moments has been reduced by the mass of the weight.

When the engine is running, the sleeve 43 turns with the airscrew, thus running the air pump through the gears 51 and 52. If the valve on the discharge side of the pump is in the full open position, there is no load on the pump and consequently the reactive torque upon the sleeve is only a negligible amount due to friction. When the valve is in this position, the control moment will more than over-balance the inherent centrifugal and aerodynamic moments thus resulting in a pitch setting higher than is desired.

This pitch setting would cause the airscrew to absorb more power than the engine can produce at the value of R. P. M. selected and consequently the R. P. M. of the engine will be less than the selected value. As the R. P. M. are less than the selected value, the governor operates to close the valve, thus applying a load to the pump. In consequence of this load upon the pump a definite reactive torque is transmitted to the sleeve and through the gear train to the airscrew blades tending to reduce their pitch.

As the pitch decreases the load absorbed by the airscrew likewise decreases, thus permitting the engine to speed up until the desired value of R. P. M. is reached.

If the R. P. M. of the engine are higher than the desired value, the governor operates to open the valve, thus relieving the load on the air pump and reducing the reactive torque tending to reduce the pitch of the blades. The control moment being sufficiently large to overbalance the inherent centrifugal and aerodynamic moments at the desired value of R. P. M., will then force the blades into a higher pitch setting, thus increasing the load on the airscrew and reducing the R. P. M. of the engine until the governor again operates to close the valve and restore equilibrium.

In the diagram in Figure 11, illustrating this arrangement, the arrow labelled "pneumatic reaction reducing pitch" indicates the action of the constant speed mechanism, the thrust acting at C. P. (the centre of pressure) indicates the aerodynamic moment, "I" the inherent centrifugal moment and "C" the control moment.

The arrangement illustrated in Figures 6, 7 and 8, and set forth in diagrammatic form in Figures 10 and 12, involves the use of two air pumps, each run by a separate sleeve, these two sleeves being geared together at the airscrew end, by means of the wide gears 61, in such a way as to impart opposing torques to the airscrew blades through the gear trains in the hub.

In this arrangement the control moments are designed to balance as nearly as possible the aerodynamic and inherent centrifugal moments occurring in the blades under all conditions of flight when the engine is developing full power at maximum R. P. M. It will thus be seen that when both valves are open, and both pumps running at no load, the blades will automatically take up a pitch setting close to that desired. If this automatic pitch setting is too high the airscrew will absorb more power than the engine can produce at the desired value of R. P. M. and the engine will consequently slow down, the governor will then automatically close the valve on the pump which is so geared as to reduce pitch by torque reaction, thus relieving the load on the engine and permitting it to increase its R. P. M. and restore equilibrium. If on the other hand the automatic pitch setting is too low the airscrew will not absorb all the power that the engine can deliver at the selected R. P. M. and consequently the engine will speed up, thus causing the governor to operate in the reverse direction, closing the valve on the other pump which is so geared as to increase pitch by torque reaction.

The diagrammatic showing in Figure 9 and the diagram in Figure 13 illustrate an arrangement in which two pumps are used. One pump is driven by the airscrew through one gear train and sleeve. This pump 65 is of such a type that, when air under pressure is supplied to the intake and when the discharge is unrestricted, it will operate as an air motor. When operating as an air pump, the pump 65 applies reactive torque to the airscrew blades through the gear trains and sleeve in the pitch reducing direction.

When operating as an air motor, the pump 65 tends to over-run the sleeve, thereby imparting torque to the airscrew blades in the pitch increasing direction.

The second pump is driven directly by the engine and is of greater capacity than the first pump, so that when all the air delivered by the second pump is applied to the intake of the first, the latter will run as an air motor.

The valves 70 and 71 are operated by the governor in the same manner as that in which the valves 50 and 64 are operated in the arrangement employing two air pumps driven by two sleeves.

When the valve 71 is closed, however, instead of torque reaction being imparted to the airscrew blades through the drive of pump 66 it is imparted through pump 65 acting as an air motor.

In any of the preceding arrangements, the airscrew can be made to reverse its thrust, i. e. act as a brake, in the following manner. A manually operated valve 77 is connected in the discharge line of the pump which operates to reduce pitch. When this valve is closed, the airscrew blades are subjected to the maximum torque reaction of which the pump is capable. The pump and gear trains leading to the airscrew blades are designed to be sufficiently powerful to more than overcome the total twisting moments in the blades. When this is done, the pitch of the blades is reduced to beyond the position of "no thrust." The diagram in Figure 14 illustrates this effect and shows that the thrust is reversed.

The graph in Figure 15 shows typical relative values of the twisting moments occurring in the airscrew blades and of the control moments and torque reaction moments required for satisfactory operation of this invention. The curve A shows the aerodynamic twisting moments occurring at various pitch settings, with power output and R. P. M. constant. The curve I represents the inherent centrifugal moments at various pitch settings with constant R. P. M.

The curve A+I is the sum of the two curves already described, while the curve C shows the values of control moments at various pitch settings approximately balancing A+I. The vertical distances $T_1$ and $T_2$ indicate the relative magnitude of the moments produced by the torque reaction of the pitch reducing and pitch increasing pumps respectively required to correct the differences between C and A+I, while the shaded areas $F_1$ and $F_2$ indicate the magnitude of friction moments which the torque reaction of the air pumps may have to overcome in order to achieve positive control.

In the foregoing description, air pumps or a combination of air pumps and air motors have been described as the sources of torque reaction. It will be understood that these pumps and motors could be adapted to employ any gaseous mixture, or could be hydraulic employing oil or any other fluid as an operating medium. They could also be replaced by generators and motors employing electricity, without altering the general arrangement or efficiency of control. In the latter case, rheostats or some other load varying device would be substituted for the valves referred to.

From the foregoing, it will be apparent that this invention provides a controllable pitch airscrew which can be set to run at any value of R. P. M. selected by the pilot; which can be reversed in thrust at the will of the pilot and thus employed either as a brake while in the air and as an aid to manoeuvering on the ground, but which at the same time is positive in action, depending as it does upon direct mechanical transmissions without the use of fluid or electrical connections to the airscrew.

What I claim is:

1. In an airscrew, a driven shaft, a hub mounted thereon, blades, in which the inherent twisting moments tend to reduce pitch, rotatably mounted in said hub and connected with each other for synchronous rotation in opposite directions, a geared sleeve carried by said hub concentrically about said shaft, a gear train operable from either end connecting said sleeve with said blades for pitch-changing movement, a pump driven by said airscrew through said sleeve, means to load said pump thereby applying a reactive twisting moment through said sleeve and gear train to the airscrew blades to increase their pitch in opposition to the inherent twisting moments, and a governor regulating said means to increase or decrease the load on said pump as the rotational speed of the airscrew increases or decreases thereby increasing, maintaining or permitting decrease in pitch of the airscrew blades.

2. In an airscrew, a driven shaft, a hub mounted thereon, blades, in which the inherent twisting moments tend to reduce pitch, rotatably mounted in said hub and connected with each other for synchronous rotation in opposite directions, centrifugal means including a weight adapted to reduce the inherent twisting moments, a geared sleeve carried by said hub concentrically about said shaft, a gear train operable from either end connecting said sleeve with said blades for pitch-changing movement, a pump driven by said airscrew through said sleeve, means to load said pump thereby applying a reactive twisting moment through said sleeve and gear train to the airscrew blades to increase their pitch in opposition to the inherent twisting moments, and a governor regulating said means to increase or decrease the load on said pump as the rotational speed of the airscrew increases or decreases thereby increasing, maintaining or permitting decrease in pitch of the airscrew blades.

3. In an airscrew, a driven shaft, a hub mounted thereon, blades, in which the inherent twisting moments tend to reduce pitch, rotatably mounted in said hub and connected with each other for synchronous rotation in opposite directions, centrifugal means including a weight adapted to overbalance the inherent twisting moments, a geared sleeve carried by said hub concentrically about said shaft, a gear train operable from either end connecting said sleeve with said blades for pitch-changing movement, a pump driven by said airscrew through said sleeve, means to load said pump thereby applying a reactive twisting moment through said sleeve and gear train to the airscrew blades to decrease their pitch in opposition to said centrifugal means, and a governor regulating said means to increase or decrease the load on said pump as the rotational speed of the airscrew decreases or increases thereby decreasing, maintaining or permitting increase in pitch of the airscrew blades.

4. In an airscrew, a driven shaft, a hub mounted thereon, blades, in which the inherent twisting moments tend to reduce pitch, rotatably mounted in said hub and connected with each other for synchronous rotation in opposite directions, centrifugal means including a weight adapted to approximately balance the inherent twisting moments, a pair of geared sleeves carried by said hub concentrically about said shaft, a gear train operable from either end connecting said sleeves with said blades for pitch changing movement and causing said sleeves to rotate in opposite directions as said blades change their pitch, a pair of pumps driven by said airscrew each through one of said sleeves, means to load either of said pumps thereby applying a reactive twisting moment through the gear train to the airscrew blades tending to change their pitch in either direction, and a governor regulating said means to increase or decrease the load on either of said pumps in accordance with variations in rotational speed of the airscrew thereby increasing, maintaining or decreasing the pitch of the airscrew blades.

5. In an airscrew, a driven shaft, a hub mounted thereon, blades rotatably mounted in said hub connected with each other for synchronous rotation in opposite directions, a geared sleeve carried by said hub concentrically about said shaft, a gear train operable from either end connecting said sleeve with said blades for pitch changing movement, a pump driven by said airscrew through said sleeve, a second pump of greater capacity driven by said shaft, a discharge line from the output of the first pump, a pipe connection from the output of the second pump to the inlet of the first pump, a branch line from said pipe connection, said first pump being adapted to operate as a motor thus reversing its torque reaction when pressure is applied to its inlet, a valve in the discharge line of the first pump, a second valve in said branch line, and governor means controlling said valves in accordance with increase or decrease of rotational speed of the airscrew thus applying a reactive twisting moment, in either direction from said first pump through said sleeve, to the blades to maintain their pitch setting or through change of pitch setting to restore the desired rotational speed of the airscrew.

6. In an airscrew, a driven shaft, a hub mounted thereon, blades, in which the inherent twisting moments tend to reduce pitch, rotatably mounted in said hub and connected with each other for synchronous rotation in opposite directions, centrifugal means including a weight adapted to approximately balance the inherent twisting moments, a geared sleeve carried by said hub concentrically about said shaft, a gear train operable from either end connecting said sleeve with said blades for pitch changing movement, a pump driven by said airscrew through said sleeve, a second pump of greater capacity driven by said shaft, a discharge line from the output of the first pump, a pipe connection from the output of the second pump to the inlet of the first pump, a branch line from said pipe connection, said first pump being adapted to operate as a motor thus reversing its torque reaction when pressure is applied to its inlet, a valve in the discharge line of the first pump, a second valve in said branch line, and governor means controlling said valves in accordance with increase or decrease of rotational speed of the airscrew thus applying a reactive twisting moment, in either direction from said first pump through said sleeve, to the blades to maintain their pitch setting or through change of pitch setting to restore the desired rotational speed of the airscrew.

7. In an airscrew, a driven shaft, a hub mounted thereon, blades, in which the inherent twisting moments tend to reduce pitch, rotatably mounted in said hub and connected with each other for synchronous rotation in opposite directions, centrifugal means including a weight adapted to approximately balance the inherent twisting moments, a geared sleeve carried by said hub concentrically about said shaft, a gear train operable from either end connecting said sleeve with said blades for pitch changing movement, a pump driven by said airscrew through said sleeve, a second pump of greater capacity driven by said shaft, a discharge line from the output of the first pump, a pipe connection from the output of the second pump to the inlet of the first pump, a branch line from said pipe connection, said first pump being adapted to operate as a motor thus reversing its torque reaction when pressure is applied to its inlet, a valve in the discharge line of the first pump, a second valve in said branch line, governor means controlling said valves in accordance with increase or decrease of rotational speed of the airscrew thus applying a reactive twisting moment, in either direction from said first pump through said sleeve, to the blades to maintain their pitch setting or through change of pitch setting to restore the desired rotational speed of the airscrew, and means manually operable adapted to alter the setting of said governor to effect a change in the rotational speed of the airscrew.

8. In an airscrew, a driven shaft, a hub mounted thereon, blades, in which the inherent twisting moments tend to reduce pitch, rotatably mounted in said hub and connected with each other for synchronous rotation in opposite directions, centrifugal means including a weight adapted to approximately balance the inherent twisting moments, a geared sleeve carried by said hub concentrically about said shaft, a gear train operable from either end connecting said sleeve with said blades for pitch reducing movement when said sleeve is retarded and for pitch increasing movement when said sleeve overruns said hub, a pump driven by said airscrew through said sleeve, a second pump of greater capacity driven by said shaft, a discharge line from the output of the first pump, a pipe connection from the output of the second pump to the inlet of the first pump, a branch line from said pipe connection, said first pump being adapted to operate as a motor thus reversing its torque reaction when pressure is applied to its inlet, a valve in the discharge line of the first pump, a second valve in said branch line, governor means controlling said valves in accordance with increase or decrease of rotational speed of the airscrew thus applying a reactive twisting moment, in either direction from said first pump through said sleeve, to the blades to maintain their pitch setting or through change of pitch setting to restore the desired rotational speed of the airscrew, and a manually operated valve in the discharge line of the first pump which, when closed, applies a maximum load to the first pump producing a reactive twisting moment turning the airscrew blades to their extreme low pitch setting.

GRETTIR ALGARSSON.